United States Patent [19]

Jeon et al.

[11] Patent Number: 5,500,792
[45] Date of Patent: Mar. 19, 1996

[54] ZERO-VOLTAGE SWITCHING TYPE ELECTRONIC BALLAST FOR FLUORESCENT LAMP

[75] Inventors: Dal-Young Jeon; Kyung-Ha Jee; Nak-Choon Choi; Bok-Ki Song; Dong-Myeong Shin, all of Bucheon, Rep. of Korea

[73] Assignee: Samsung Electronics Co., Ltd., Suwon, Rep. of Korea

[21] Appl. No.: 265,847

[22] Filed: Jun. 24, 1994

[30] Foreign Application Priority Data

| Jun. 24, 1993 | [KR] | Rep. of Korea | 93-11624 |
| Oct. 27, 1993 | [KR] | Rep. of Korea | 93-22505 |
| Nov. 15, 1993 | [KR] | Rep. of Korea | 93-24241 |
| Dec. 21, 1993 | [KR] | Rep. of Korea | 93-28899 |

[51] Int. Cl.$^6$ .......................... H02M 7/537; H05B 37/02
[52] U.S. Cl. .................. 363/98; 363/132; 363/17; 315/190; 315/291; 315/307; 315/294
[58] Field of Search .................. 363/132, 17, 98, 363/71–72, 15, 24, 37, 65, 131–134; 315/190, 291, 205, 244, 307, DIG. 7

[56] References Cited

U.S. PATENT DOCUMENTS

| 5,063,490 | 11/1991 | Maehara et al. | 363/37 |
| 5,303,140 | 4/1994 | Shimizu | 363/132 |
| 5,313,143 | 5/1994 | Vila-Masot | 315/209 R |

*Primary Examiner*—Peter S. Wong
*Assistant Examiner*—Aditya Krishnan
*Attorney, Agent, or Firm*—Cushman Darby & Cushman

[57] ABSTRACT

A zero-voltage switching type electronic ballast for a fluorescent lamp includes a pair of capacitors connected in series between first and second nodes of a DC power source; a pair of switching devices whose current passages are connected in series between the first and second nodes of the DC power source; a load resonant circuit portion having a serial resonant circuit between the connection node of the pair of capacitors and the connection node of the pair of switching devices, and a discharge lamp; capacitors each connected in parallel to the current passage of the switching devices; a driving transformer having a secondary side which includes first and second windings each connected to the respective switching devices and having opposite polarities, and a third winding having the same polarity as the first winding and connected between the connection node of the pair of switching devices and the load resonant circuit, and a primary side having a fourth winding to which a switching control signal of a predetermined high frequency is applied. A switching control signal generating circuit compares a comparison signal of a predetermined high frequency with first and second reference.

13 Claims, 14 Drawing Sheets

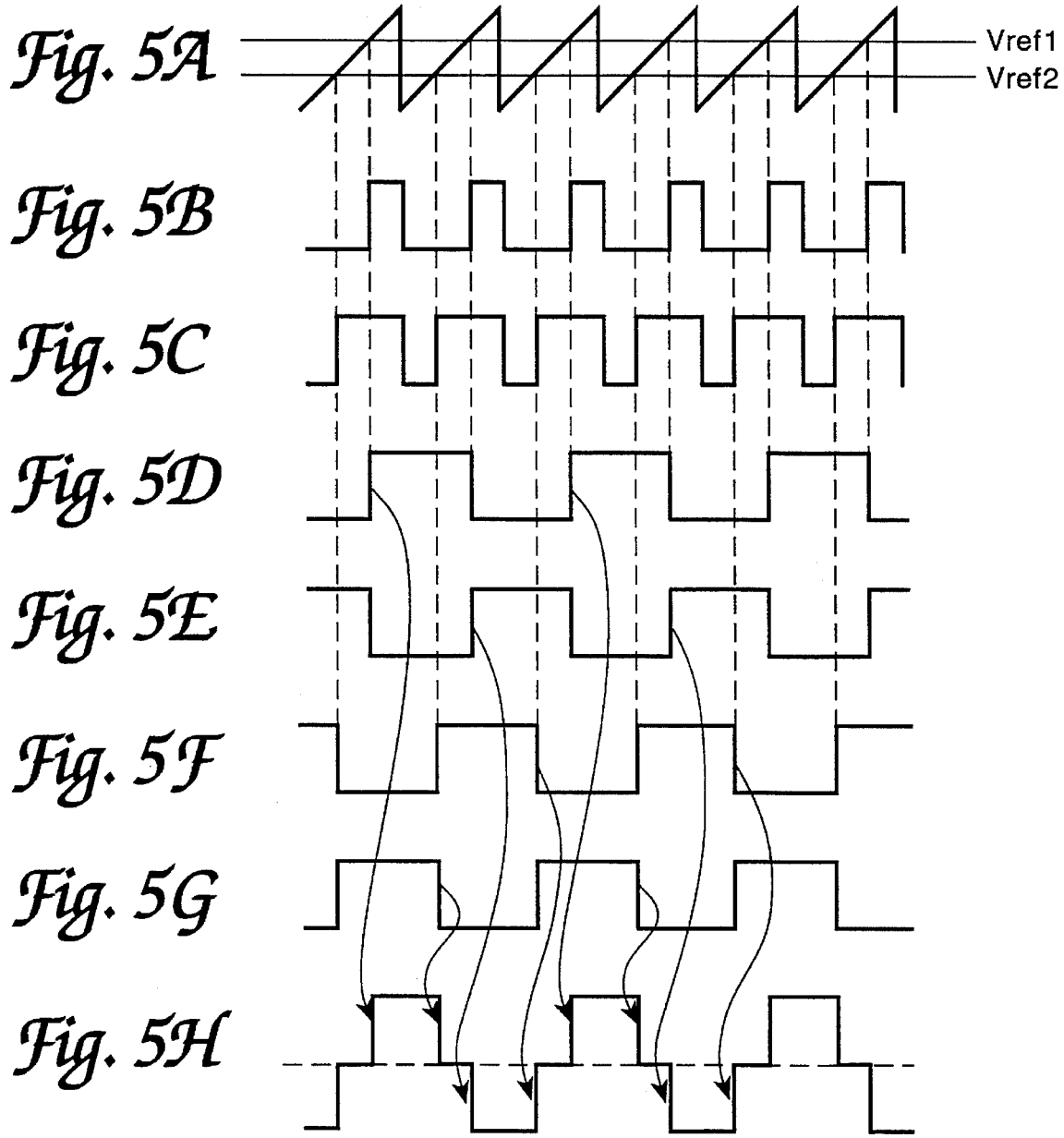

ZERO-VOLTAGE SWITCHING TYPE ELECTRONIC BALLAST FOR FLUORESCENT LAMP

BACKGROUND OF THE INVENTION

1. Field of the Invention

The present invention relates to a zero-voltage switching type electronic ballast for a fluorescent lamp, and more particularly, to a zero-voltage switching type electronic ballast for a fluorescent lamp, wherein a switching operation is performed at the moment when the terminal voltage is zero, and which provides an improvement to the switching control signal generating circuit.

2. Background of Related Art

For the ballasts for use in fluorescent lamps, large and heavy coil ballasts have been replaced with electronic ballasts which are relatively compact and light. A conventional electronic ballast is mainly constituted of the self-oscillation type electronic ballast as shown in FIG. 1. In the self-oscillation ballast of FIG. 1, a direct current (DC) voltage, which is obtained by full-wave-rectifying an alternating current (AC) voltage and smoothing the thus-obtained voltage waveform, is used to charge a capacitor C2 via a resistor R1. When this charging voltage reaches the conduction voltage of a diac DAC, the diac instantaneously applies a DC bias voltage for a transistor Q2, which therefore turns on and begins the self-oscillation. Here, transistor Q2 has an opposite applied base-emitter voltage than a transistor Q1, so that an alternating switching operation is performed.

However, such a self-oscillation type electronic ballast has several drawbacks, including the following.

1) Energy conservation is not achieved even for the variation in low power voltage.

2) Since the switching devices are very inefficient due to the high-frequency operation (considered the most fundamental function of an electronic stabilizer), energy savings is very poor and the reliability of the switching devices is also poor due to a heating of the devices due to the high frequency.

3) The high frequency components (harmonics) produced by the switching operation may cause electrical interference and may produce noise sources (see "High Frequency Resonant Inverter for Group Dimming Control of Fluorescent Lamp Lighting Systems" by K. H. Lee, E. C. Nho and G. H. Cho, *IEEE TES Annual Meeting Conference Rec.*, p149–p154, 1989).

4) Since a high voltage is applied to the filament of the fluorescent lamp in the initial step of discharging, sputtering and subsequent blackening as a result thereof may reduce lamp life.

Accordingly, the inventor of the present invention has suggested a technology (disclosed in Korean Patent Publication No. 91–5118) wherein the driving current is detected prior to discharge and then, if the detected current is larger than a predetermined value, the turn-on time of the switching device is designed to be delayed so that part of the energy stored in the resonant circuit is regenerated as the power source, and therefore the surge voltage induced across the discharge lamp is suppressed to improve the life time of the electric discharge lamp. The inventor has also suggested a zero-voltage switching type current controlled inverter circuit (disclosed in Korean Patent Publication No. 92–4995) wherein a zero-voltage switching method is adopted to lower the slope of the voltage across the switching device, so that harmonics may be removed.

In the Korean Patent Publication No. 92–4995, however, the amplitude and phase of the load current is detected by means of a current transformer, and the thus-detected signal is positively fed back so that the switching devices are controlled by means of alternate zero-voltage switching. Therefore, since the switching operation is performed based on the resonant frequency of the oscillation, the frequency characteristic may vary according to peripheral conditions and component characteristics, which is undesirable. Also, the driving transformer for such a device has a winding structure which is complex because a current transformer, a winding for operation in the pseudo-saturation domain, and a winding for detecting the load current are all necessary. Furthermore, overheating of the switching device and voltage breakdown due to excessive current cannot be prevented in such a conventional device.

SUMMARY OF THE INVENTION

Therefore, to solve the above-described problems, it is an object of the present invention to provide a zero-voltage switching type electronic ballast for a fluorescent lamp which comprises a switching control signal generator for holding a switching frequency stable.

It is another object of the present invention to provide a zero-voltage switching type electronic ballast for a fluorescent lamp in which a power source of the switching control signal generating circuit has a feedback power of the resonant circuit applied thereto in order to reduce power losses, and whose configuration is simplified.

It is still another object of the present invention to provide a zero-voltage switching type electronic ballast for the fluorescent lamp in which a filament of the electric discharge lamp is preheated prior to a discharging operation so that a blackening of the lamp may be prevented and so that the life of the ballast can be extended.

It is yet another object of the present invention to provide a zero-voltage switching electronic ballast for a fluorescent lamp which enhances a noise reduction effect and improves reliability by means of smoothing the frequency variation.

It is a further object of the present invention to provide a zero-voltage switching type electronic ballast for a fluorescent lamp which prevents a blackening of the lamp that may be caused by a short preheating time at a low temperature, by adaptively controlling the preheating time according to a variation in the ambient temperature.

It is yet still another object of the present invention to provide a zero-voltage switching type electronic ballast for a fluorescent lamp in which the brightness thereof can be automatically adjusted according to circumferential brightness.

To accomplish the above objects, the present invention provides a zero-voltage switching type electronic ballast for a fluorescent lamp comprising a pair of capacitors connected in series between two nodes of a DC power source. The device also comprises a pair of switching devices whose current paths are connected in series between the nodes of the DC power source, a load resonant circuit portion having a series resonant circuit between the connection node of the pair of capacitors and the connection node of the pair of switching devices, and a discharge lamp. Capacitors are connected in parallel with the current path of the switching devices, and a driving transformer having a secondary side with two windings which are each connected to the gate of the pair of switching devices and have opposite polarities. The driving transformer also has a third winding having the same polarity as the first winding connected between the connection node of the pair of switching devices and the load resonant circuit, and a primary side having a fourth winding to which a switching control signal of a predetermined high frequency is applied. A switching control signal generating circuit compares a comparison signal of a predetermined high frequency with reference signals, interposes a predetermined dead time therebetween, and thereby drives the fourth winding of the driving transformer so that the switching devices are alternately switched at the moment that the voltage applied at the current path is zero.

Accordingly, in the present invention, the switching control signal is produced by the switching control signal generating circuit wherein the established high frequency comparison signal is compared with the reference signal, so that the frequency of the switching drive signal becomes stable and the system configuration becomes simplified, which therefore facilitates integration. Also, the zero-voltage switching condition can be optimized by setting the reference signal such that the switching can be optimally controlled, i.e., when the voltage across the switching device is zero.

The switching control signal generating circuit comprises a sawtooth wave signal generator for, upon power application, generating a first frequency of a comparison signal for a predetermined time, and after the predetermined time, generating a second frequency of a comparison signal. It also has a square wave signal generator for comparing the comparison signal and generating a square wave signal, a driving signal generator for generating a driving signal after receiving the square wave signal, and a driving circuit portion for alternately driving the fourth winding of the primary side of the driving transformer by the driving signal in the forward and reverse directions. A dead time is interposed for guaranteeing the zero-voltage switching of the switching devices between the forward and reverse directions.

Accordingly, the frequency of the comparison signal is variably controlled so that the filament of the discharge lamp can be sufficiently preheated, thus enabling a lower discharge starting voltage. Therefore, the blackening phenomenon of an electric discharge lamp can be prevented, and therefore extends the lamp's life.

Moreover, in the present invention, part of the resonance current is fed back to the fourth winding of the primary side of the driving transformer via the third winding of the secondary side, and this feedback current is supplied as the operating power source for the switching control signal generating circuit via the driving circuit portion. This simplifies the circuit configuration and reduces power consumption, because it becomes unnecessary to have an additional operating power source for the integrated circuit.

Furthermore, in the present invention, since the variation in the input power source is detected based on the current variation, and the comparison signal's frequency is set to be varied in response to the detection result, a uniform input power can be obtained over a wide range of input voltages, and light intensity can be maintained at a uniform output level.

Also, the present invention improves system reliability by detecting whether the switching device is overheated and by detecting whether the current flow is excessive.

BRIEF DESCRIPTION OF THE DRAWINGS

These and other objects, features, aspects and advantages of the present invention will become more apparent from the following detailed description of the present invention when taken in conjunction with the accompanying drawings, in which:

FIGS. 5A–5H and 6A–6K show waveforms illustrating the operation according to another preferred embodiment of the present invention;

FIGS. 15A–15K show waveforms present at the respective portions of the circuit of FIG. 14.

DETAILED DESCRIPTION OF PREFERRED EMBODIMENTS

Figure 1:
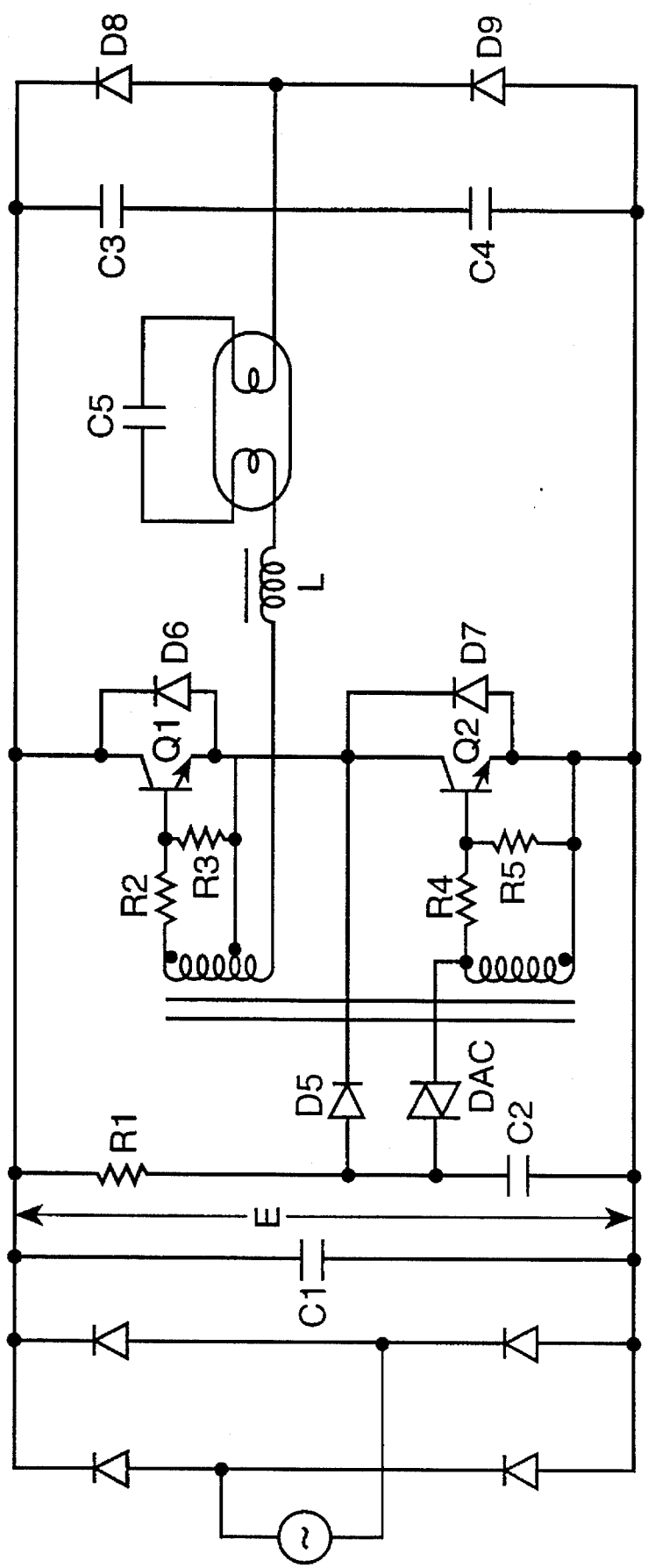
FIG. 1 is a circuit diagram showing the conventional self-oscillation type electronic ballast for a fluorescent lamp.
Figure 2:
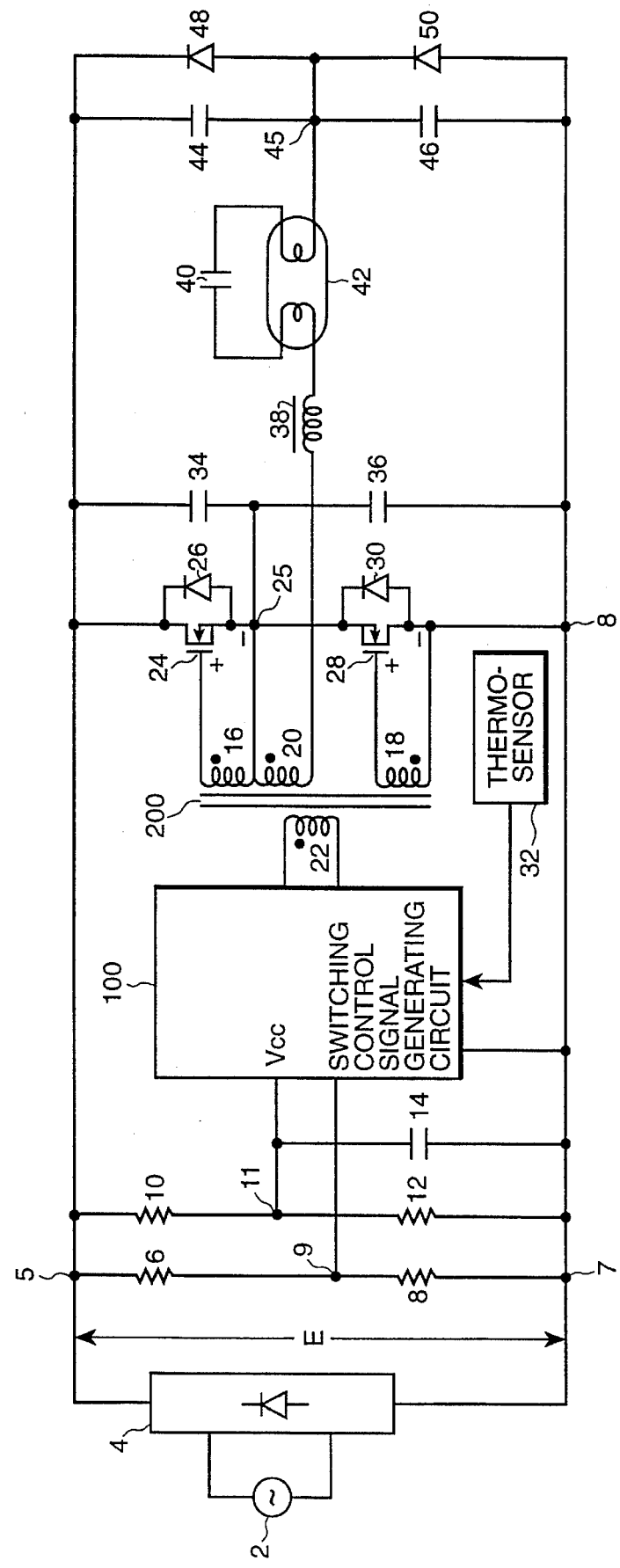
FIG. 2 shows the configuration of a zero-voltage switching type electronic ballast for a fluorescent lamp according to the present invention.

FIG. 2 shows a common AC source 2 being supplied to a DC power source circuit 4 constituted by a bridge rectifying/smoothing circuit. Resistors 6 and 8 are connected in series between first and second nodes 5 and 7 of the DC power source circuit 4, as are resistors 10 and 12. A capacitor 14 is connected in parallel with resistor 12. A switching control signal generating circuit 100 which is connected to a connection node 9 between resistors 6 and 8, to a connection node 11 between resistors 10 and 12, and to a fourth winding 22 of a driving transformer 200. The circuit configuration of Switching Control Signal Generating Circuit 100 will be described later in more detail.

A pair of switching devices 24 and 28 are each constructed of a field-effect transistor (FET). Switching devices 24 and 28 include reverse-biased diodes 26 and 30 which are respectively connected across the drain-to-base terminals of the FETs. The drain of the first switching device 24 is connected to the first node 5 of the DC power source circuit 4. A first winding 16 of the driving transformer 200 is connected between the gate and source of the first switching device 24. The source of the second switching device 28 is connected to the second node 7 of the DC power source circuit 4. A second winding 18 of the driving transformer 200 is connected between the gate and source of the second switching device 28. The source of the first switching device 24 and the drain of the second switching device 28 are commonly connected at connection node 25. Thus, a configuration is obtained such that a series current path for the first and second switching devices 24 and 28 is formed between the first and second nodes 5 and 7 of the DC power source circuit 4. The first and second switching devices 24 and 28 are arranged on a heat-radiating plate (not shown) which has thereon a thermo-sensor 32 for applying a temperature detecting signal to Switching Control Signal Generating Circuit 100 in order to prevent the circuit from becoming overheated. A capacitor 34 is connected between connection node 25 and the drain of first switching device 24, and a capacitor 36 is connected between the connection node 25 and the source of the second switching device 28. One end of a third winding 20 of the driving transformer 200 is connected to connection node 25, and the other end of the third winding 20 is serially connected with a resonance inductor 38, and a filament of an electric discharge lamp 42 in parallel with a resonance capacitor 40, to connection node 45. A capacitor 44 and a reverse-biased diode 48 are connected in parallel with respect to each other between the first node 5 of the DC power source 4 and connection node 45. Also, a capacitor 46 and a reverse-biased diode 50 are connected in parallel with respect to each other between connection node 45 and the second node 7 of the DC power source 4.

Regarding the driving transformer 200, the first and third windings 16 and 20 on the secondary side and the fourth winding 22 on the primary side all have the same polarity, while the second winding 18 has the opposite polarity. Therefore, when current flows through the fourth winding 22 in a first direction, the induced voltages in the first and third windings 16 and 20 have the same polarity, so that the first switching device 24 turns on. However, the second winding 18 has an induced voltage of the opposite polarity, so that second switching device 28 stays off. If the direction of current flows through the fourth winding 22 in a second direction opposite to the first direction, the switching devices 24, 28 operate in an opposite manner and the second switching device 28 turns on while the first switching device 24 turns off. That is, the switching devices can alternately perform an on/off switching operation.

Figure 3:
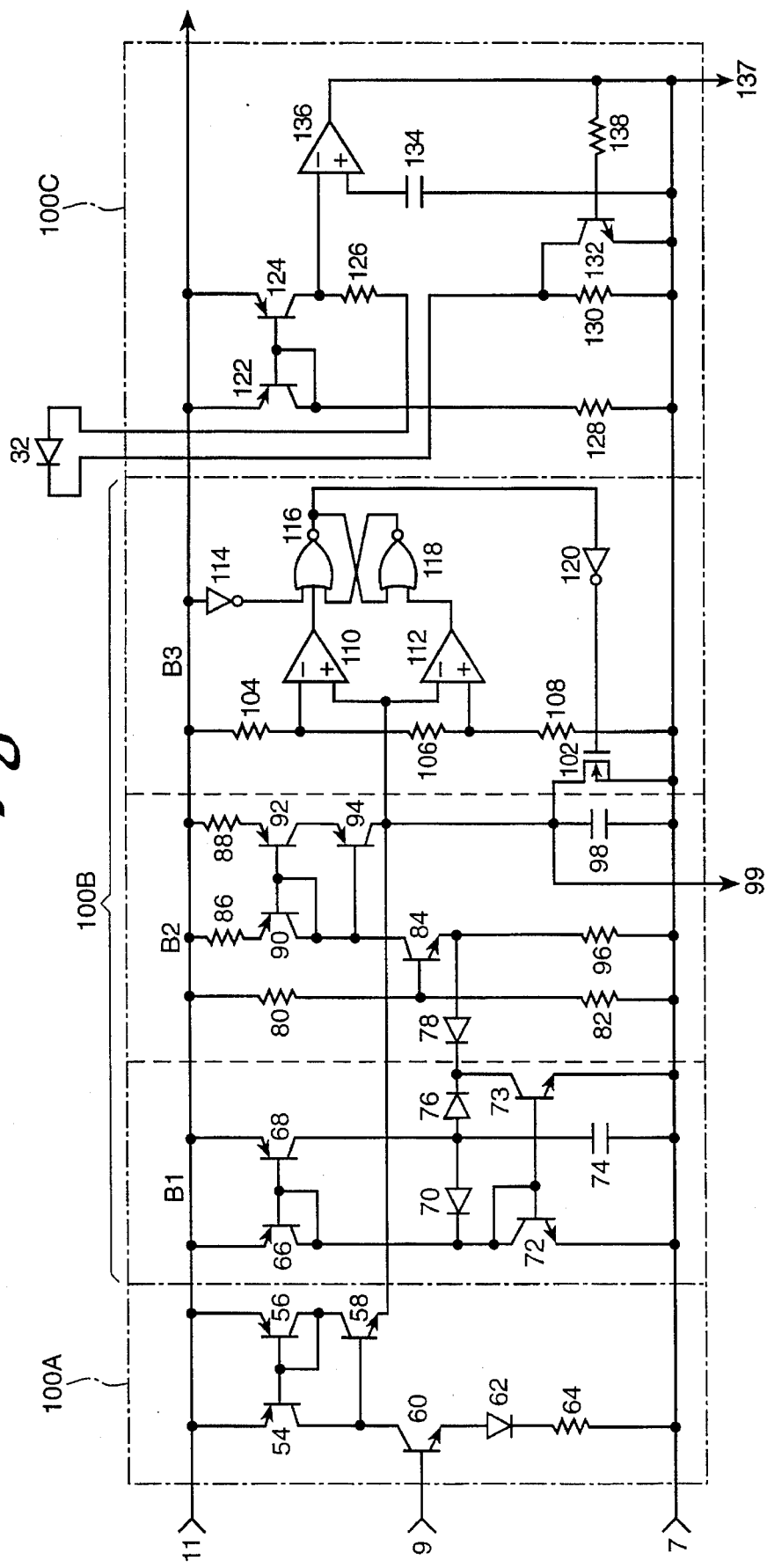
FIGS. 3 and 4 are circuit diagrams showing the switching control signal generating circuit of the electronic ballast according to the preferred embodiments of the present invention.
Figure 4:
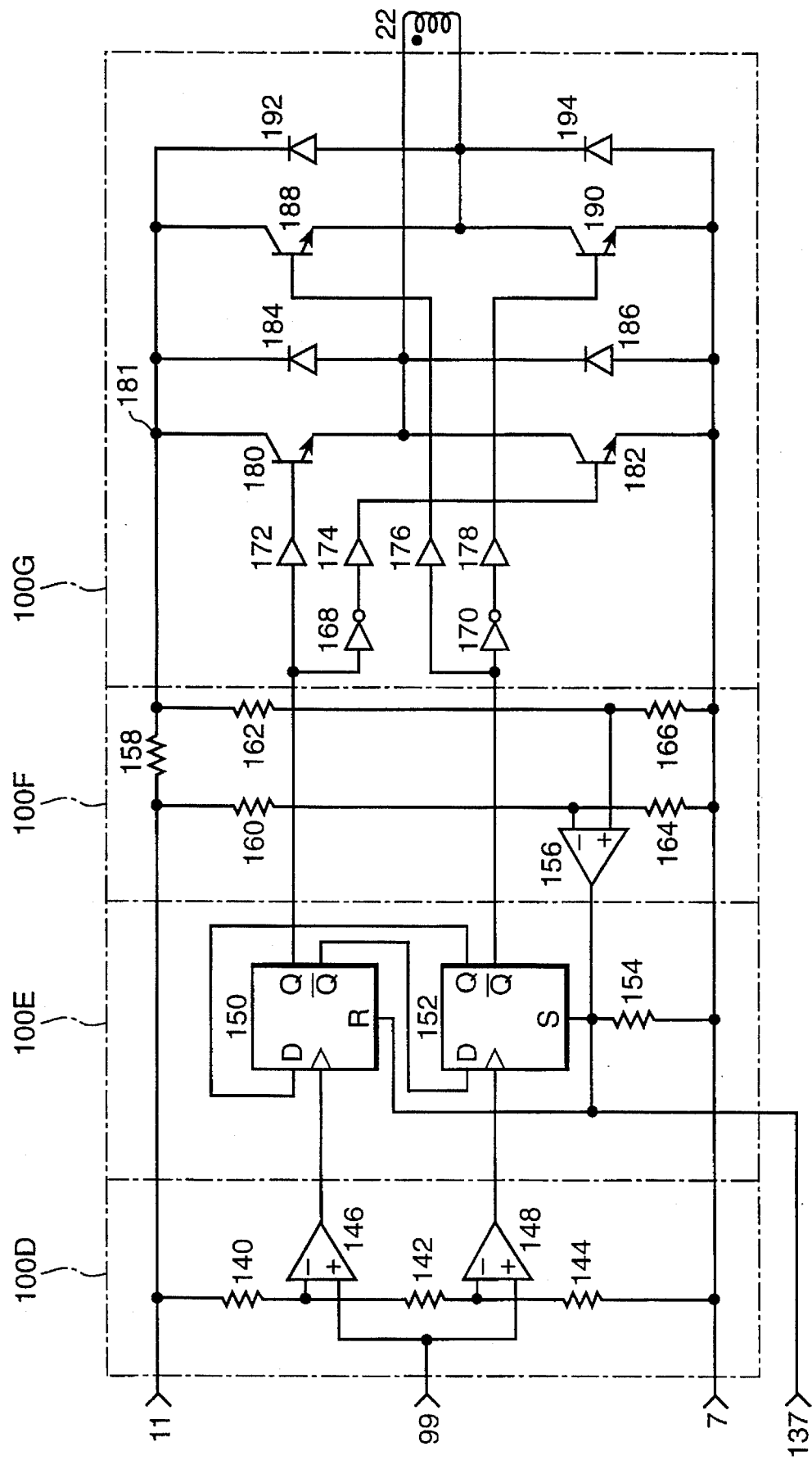

FIGS. 3 and 4 show the Switching Control Signal Generating Circuit 100 of the above embodiment, which largely comprises an input voltage variation detector 100A, a sawtooth wave signal generator 100B, an overheating preventer 100C, a square-wave signal generator 100D, a driving signal generator 100E, an over-current prevention circuit 100F, and a driving circuit portion 100G.

Output voltage E of the DC power source circuit 4 is divided across resistors 6 and 8, and the voltage signal appearing at connection node 9 is input to the base of a transistor 60 of the input voltage variation detector 100A. The collector current of transistor 60, which is responsive to the base input, is output as the emitter current of transistor 58 via current mirrors 54 and 56. The emitter of transistor 60 is connected in series to diode 62 and resistor 64. Emitter output current is provided from transistor 58 to the sawtooth wave signal generator 100B as a part of the charging current.

The sawtooth wave signal generator 100B generates a high-frequency comparison signal in the form of a sawtooth wave, and is comprised of a preheating circuit B1, a charging circuit B2, and a discharge circuit B3.

Preheating circuit B1 consists of transistors 66 and 68 for forming a source current mirror, a capacitor 74 tied between the collector of transistor 68 and the second node 7 of the DC power source 4, transistors 72 and 73 for forming a sink current mirror, a diode 70 connected between the connection node of transistors 66 and 72 and capacitor 74 for forming a first discharge path, and a diode 76 connected between capacitor 74 and the collector of transistor 73 for forming a second discharge path.

At the earlier stage of voltage application, as transistor 66 is turned on, charging current is supplied to capacitor 74 via transistor 68 and starts to be accumulated thereon. As transistor 72 and then transistor 73 are also turned on, externally applied current is sunk via transistor 73. When the charging voltage of capacitor 74 becomes higher than the base-emitter voltage of the transistor 72 and the forward-biased voltage of the diode 70, the discharge path of the capacitor is formed via diodes 70 and 76 for discharge and therefore the amount of the charging current is reduced. Due to this, the external current amount sunk via transistor 73 is also reduced.

In the charging circuit B2, resistors 80 and 82 are serially connected between connection node 11 and the second node 7 of the DC power source 4. The emitter of a transistor 84 whose base is connected to the connection node of resistors 80 and 82 is coupled to the second node 7 of the DC power source 4 via resistor 96. The emitter of transistor 84 is also tied to the collector of transistor 73 via diode 78 so that the emitter current of transistor 74 is added to the current of the preheating circuit B1. The collector of transistor 84 is connected to the collector of transistor 90 which forms the sink current mirror along with transistor 92. Emitter resistors 86 and 88 are connected to the emitters of transistors 90 and 92. The collector of transistor 92 is tied to the collector of transistor 94. The emitter of transistor 94 is coupled to capacitor 98, and its base is connected to the collector of transistor 84.

With this configuration of the charging circuit B2, at the earlier stage of power application, since the potentials of the on resistances of diode 78 and the collector and emitter of transistor 73 are applied at the emitter potential of transistor 84, a large amount of collector current flows and therefore the collector current of transistor 94 is high, with the charging time becoming shorter. If the potential of capacitor 74 increases and thereby diode 78 is reverse-biased, the emitter potential of transistor 84 increases and the collector current of transistor 94 is reduced so that the charging time of capacitor 98 is lengthened.

Discharge circuit B3 is made up of a first comparator 110 for receiving the potential of capacitor 98 via the non-inverting port, a second comparator 112 for receiving the potential thereof via the inverting port, a voltage-controlled transistor 102 whose drain-source terminals are tied to the ends of capacitor 98 and resistors 104, 106 and 108 serially connected between connection node 11 and the inverting port of comparator 110, the non-inverting port of comparator 112, and the second node 7 of the DC power source 4. Gates 114, 116, 118 and 120 are also serially connected therebetween.

In this construction of the discharge circuit B3, as the charging voltage becomes higher than a first reference voltage, the output of the first comparator 110 goes high and thereby the output of a latch consisting of gates 116 and 118 becomes low. Accordingly, transistor 102 is turned on via gate 120, and the capacitor 98 is thus discharged via the transistor 102. As the potential difference of capacitor 98 is reduced to be lower than a second reference voltage, the output of the second comparator 112 renders a high and the output of the latch becomes high. When transistor 102 is turned on via gate 120, the discharging is finished.

An overheating prevention circuit 100C comprises transistors 122 and 124 for forming a source current mirror, a resistor 128 connected between the collector of transistor 122 and the second node 7 of the DC power source 4, a resistor 126 serially connected between the collector of transistor 124 and the second node 7, a diode 32 for temperature detection, a resistor 130, a comparator 136 to whose non-inverting port a reference power source 134 is connected and to whose inverting port the collector of transistor 124 is connected, and a transistor 132 whose collector and emitter are connected to the ends of resistor 130 and to whose base the output of comparator 136 is connected via resistor 138. The overheating prevention circuit controls temperature by manipulating transistor 132 via the comparator, by which a differential exists between the detected temperature and the reference reset temperature and results in a hysteresis delay.

A square wave generator 100D contains resistors 140, 142 and 144 serially connected between connection node 11 and the second node 7, a first comparator 146 whose inverting port is connected to the connection node of resistors 140 and 142 and whose non-inverting port is connected to sawtooth wave signal output port 99, and a second comparator 148 whose inverting port is connected to the connection node of resistors 142 and 144 and whose non-inverting port is also connected to the sawtooth wave signal output port 99.

A driving signal generator 100E is comprised of a first D flip-flop 150 for receiving the output of comparator 146 in the form of a clock signal at its clock port, a second D flip-flop 152 for receiving the output of comparator 148 at its clock port, and a resistor 154 connected to the reset port of the first flip-flop 150, to the set port of the second flip-flop 152, and to the second node 7. The first flip-flop 150, receiving the positive output of the second flip-flop 152, generates its positive output as a first driving signal. The second flip-flop 152 receives the negative output of first flip-flop 150 and outputs its negative output as a second driving signal. The output signal of the overheating prevention circuit and the output signal of the over-current prevention circuit are supplied via the common connection node of the reset and set ports.

An over-current prevention circuit 100F is composed of a resistor 158 interposed between connection nodes 11 and 181, resistors 160 and 164 serially connected between connection node 11 and the second node 7, resistors 162 and 166 serially connected between connection node 181 and the second node 7, and a comparator 156 whose inverting port is connected to the connection between resistors 160 and 164 and whose noninverting port is connected to the connection between resistors 162 and 166.

When the regenerated current flowing through resistor 158 is abnormally increased, a difference voltage proportional to the voltage drop across resistor 158 is applied to the input of comparator 156. When the difference voltage is above a predetermined threshold value, the output of comparator 156 renders a high so that an overheat preventing signal is generated to reset the driving signal generator 100E.

A driving circuit 100G includes inverters 168 and 170 for inverting the first and second driving signals, respectively. Buffers 172, 174, 176 and 178 buffer the first and second driving signals and first and second inverted driving signals. A first transistor 180 whose collector and emitter are connected between connection node 181 and one end of the fourth winding 22 of the driving transformer 200, and the base to the first driving signal having passed through buffer 172. The circuit also includes a second transistor 188 whose collector and emitter are connected between connection node 181 and the other end of the fourth winding 22 and to whose base the second driving signal having passed through buffer 176 is applied, a third transistor 182 whose collector and emitter are connected between one end of the fourth winding 22 and second node 7 and to whose base the first inverted driving signal having passed through buffer 174 is applied, a fourth transistor 190 whose collector and emitter are connected between the other end of the fourth winding 22 and second node 7 and to whose base the second inverted driving signal having passed through buffer 178 is applied, and reverse-biased diodes 184, 186, 192 and 194 respectively connected to the collector and emitter of the respective first, second, third and fourth transistors 180, 182, 188 and 190.

As the first and fourth transistors 180 and 190 are turned on, current is applied to the fourth winding 22 on the primary side of the driving transformer 200 and therefore has a positively induced voltage. Conversely, as second and third transistors 188 and 182 are turned on, a voltage is applied to the fourth winding 22 in the opposite direction. Thus, the fourth winding 22 is driven in a full-bridge manner.

The regenerated current induced to the winding of the primary side, rectified by diodes 184, 186, 192 and 194 coupled to one another in a bridge structure between connection node 181 and second node 7, is accumulated in capacitor 14 shown in FIG. 2 via resistor 158. Therefore, the switching control signal generator 100, although starting to operate by receiving the initial power from the DC power circuit 4, reduces the power consumption by using regenerated current as the operation power during normal operation. Additionally, diodes function to protect the transistors of the driving circuit, simplifying the circuit configuration.

The operation of the present invention will be described hereinbelow with further reference to FIGS. 5 and 6.

When power is applied, at the initial stage, the preheating circuit B1 increases the collector current of transistor 94 until the terminal voltage of capacitor 74 is accumulated above the terminal voltage of resistor 82, thereby shortening the charging time of capacitor 98. By doing so, the frequency of the sawtooth wave signal of the sawtooth wave generator 100B becomes higher than that in the normal operation, and therefore the energy accumulation of a load resonator is reduced. This disables the start of discharge and preheats the filament of a discharge lamp. Accordingly, the preheating time can be set as the charging time of capacitor 74.

When the terminal voltage of capacitor 74 is raised over that of resistor 82, the charging circuit B2 supplies normal charging current to capacitor 98 and generates a sawtooth wave signal at a predetermined high frequency in association with the discharge circuit B3.

The square wave signal generator 100D compares the terminal voltage of capacitor 98 with the first and second reference signals Vref1, Vref2 as shown in FIG. 5A and generates the first and second square wave signals as shown in FIGS. 5B and 5C.

The driving signal generator 100E, receiving and using the first and second square wave signals as clock signals, generates first, second, third and fourth driving signals as shown in FIGS. 5D–5G. These driving signals drive the fourth winding 22 of the driving transformer 200 in a full-bridge manner which generates the switching control signal as shown in FIG. 5H. The switching control signal, having a dead time for the interval of the first and second reference signals, forms a waveform in which the positive and negative intervals appear, alternately interposing the dead time.

Figure 6A:
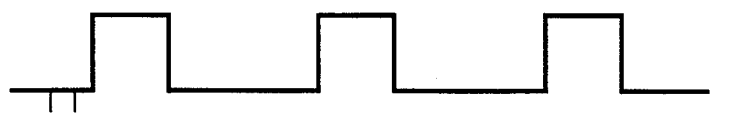
Figure 6B:
Figure 6C:
Figure 6D:

During the positive interval of the switching control signal (FIG. 5H), the same polarity of voltage appears in the first winding as shown in FIG. 6A so that the first switching device is turned on only for the time of the positive interval and that, during the negative interval, the second switching device is turned on as shown in FIG. 6B. First, at time point t0 when the turned-on second switching device is turned off, the voltage of capacitor 34 connected across the first switching device 24 goes down from the DC power voltage E to zero voltage during a lapse of a predetermined time as shown in FIG. 6C, and conversely the voltage of second capacitor 36 goes up to the DC power voltage E as shown in FIG. 6D. At time point t1 when the voltage of the second capacitor becomes higher than the DC power voltage, diode 26 becomes conductive and current flows as shown in FIG. 6G through the diode. The polarity of the magnetization direction of the driving transformer is then inverted, and the first switching device 24 is turned on at time point t2 when the current flowing through the diode becomes zero. This enables the switching operation at zero voltage.

Figure 6E:
Figure 6F:
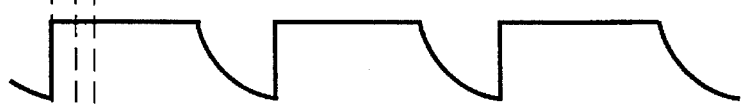
Figure 6G:
Figure 6H:
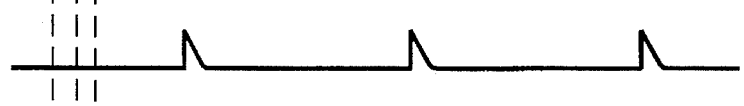
Figure 6I:
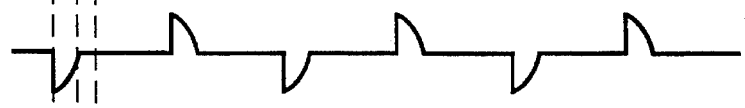
Figure 6J:
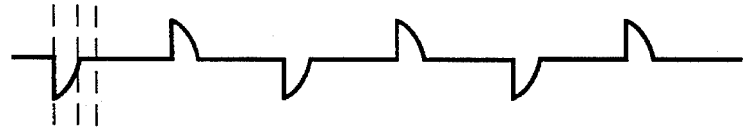
Figure 6K:

Since the resonance current waveform shown in FIG. 6K, which is a mix of the current waveforms of FIGS. 6E and 6J flowing in the load resonant circuit, is a sine wave, the high-frequency component is cancelled so that the generation of harmonics can be minimized and accordingly the damage due to such electrical interference can be reduced.

Having the input voltage variation detector, the above-discussed embodiment maintains constant light output regardless of the variation of input voltage, by, when the input voltage goes high, increasing the charging current of the charging circuit of the sawtooth wave signal generator to thereby raise the frequency and reduce the amount of the energy accumulation in the resonant circuit, or by, when the input voltage goes low, reducing the charging current to thereby lower the frequency and increase the amount of the energy accumulation in the resonant circuit.

The following table shows the comparison of input powers when the input voltage is varied from 170 V to 270 V, in the present embodiment and in the conventional method.

| input voltage (V) | input power (W) | |
| --- | --- | --- |
| | conventional method | present invention |
| 170 | 59 | 72 |
| 180 | 62 | 73 |
| 190 | 65 | 74 |
| 200 | 68 | 74 |
| 210 | 71 | 74 |
| 220 | 74 | 74 |
| 230 | 77 | 74 |
| 240 | 80 | 74 |
| 250 | 82 | 74 |
| 260 | 85 | 73 |
| 270 | 87 | 73 |

The figures of the above table were obtained by varying the input voltage from 170 V to 270 V given that the conventional case and the embodiment of the present invention are normally discharged, using input voltage varying equipment (a slide-type transformer), after attaching a power measuring apparatus (a digital power meter) to the input of the circuit. It is noted that according to the experimental results, the embodiment of the present invention maintains roughly constant input power regardless of the variation of the input voltage.

Further, since in the embodiment the overheating and over-current prevention circuits 100C, 100F are comprised to reset the driving signal generator, the system can be protected from damage to the switching devices or from the danger of fire due to an over-current condition created when the characteristics of the system itself are changed due to the aging of the discharge lamp, a poor connection thereof, or the aging of the system itself. The circuits also prevent damage to switching devices due to overheating when the switching devices are abnormally operated or when a current level in excess of the rated value is supplied. This accordingly guarantees the reliability of the system.

Figure 7:
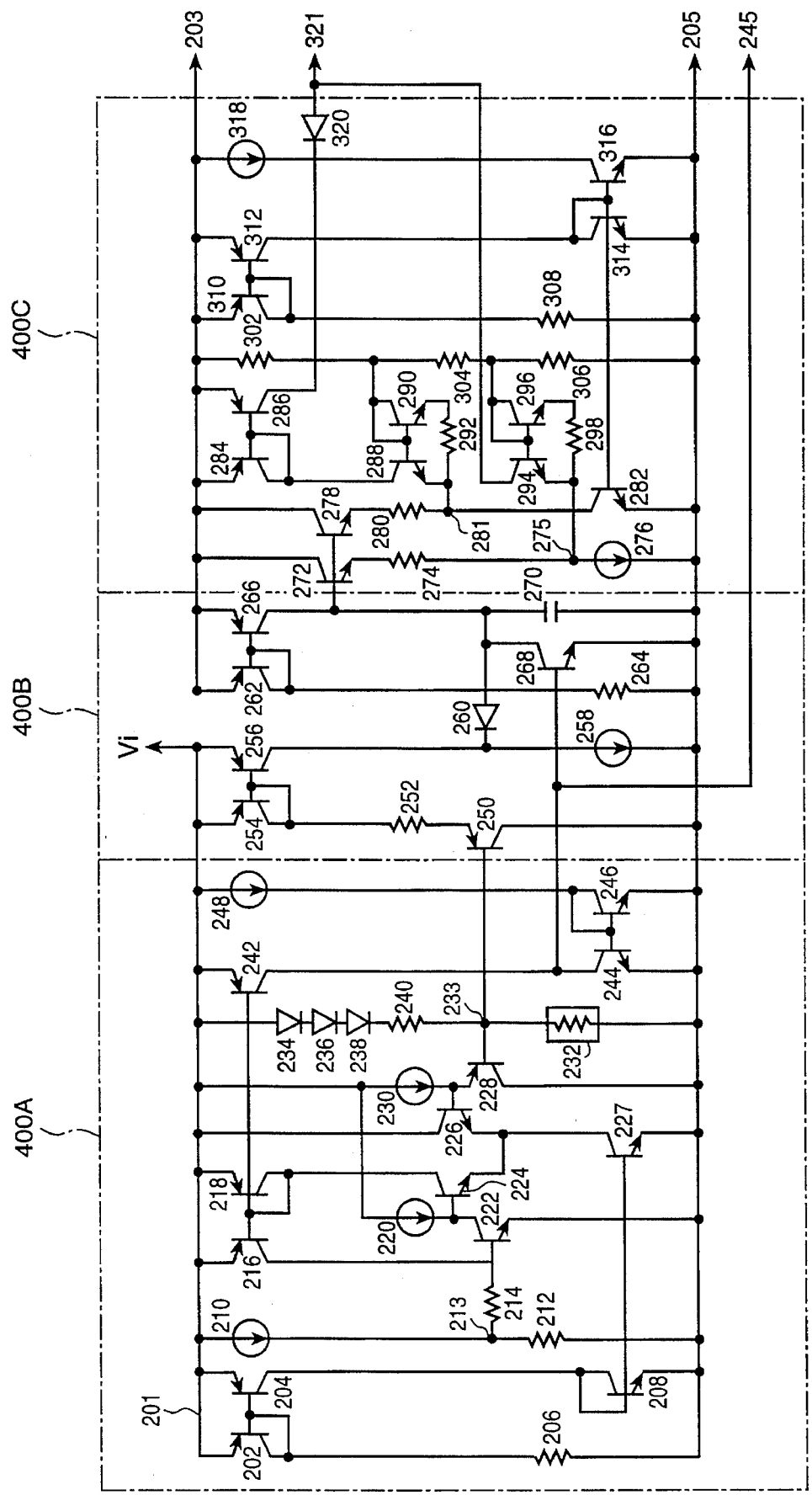
FIGS. 7 and 8 are circuit diagrams showing the switching control signal generating circuit of the electronic ballast according to still another embodiment of the present invention.
Figure 8:
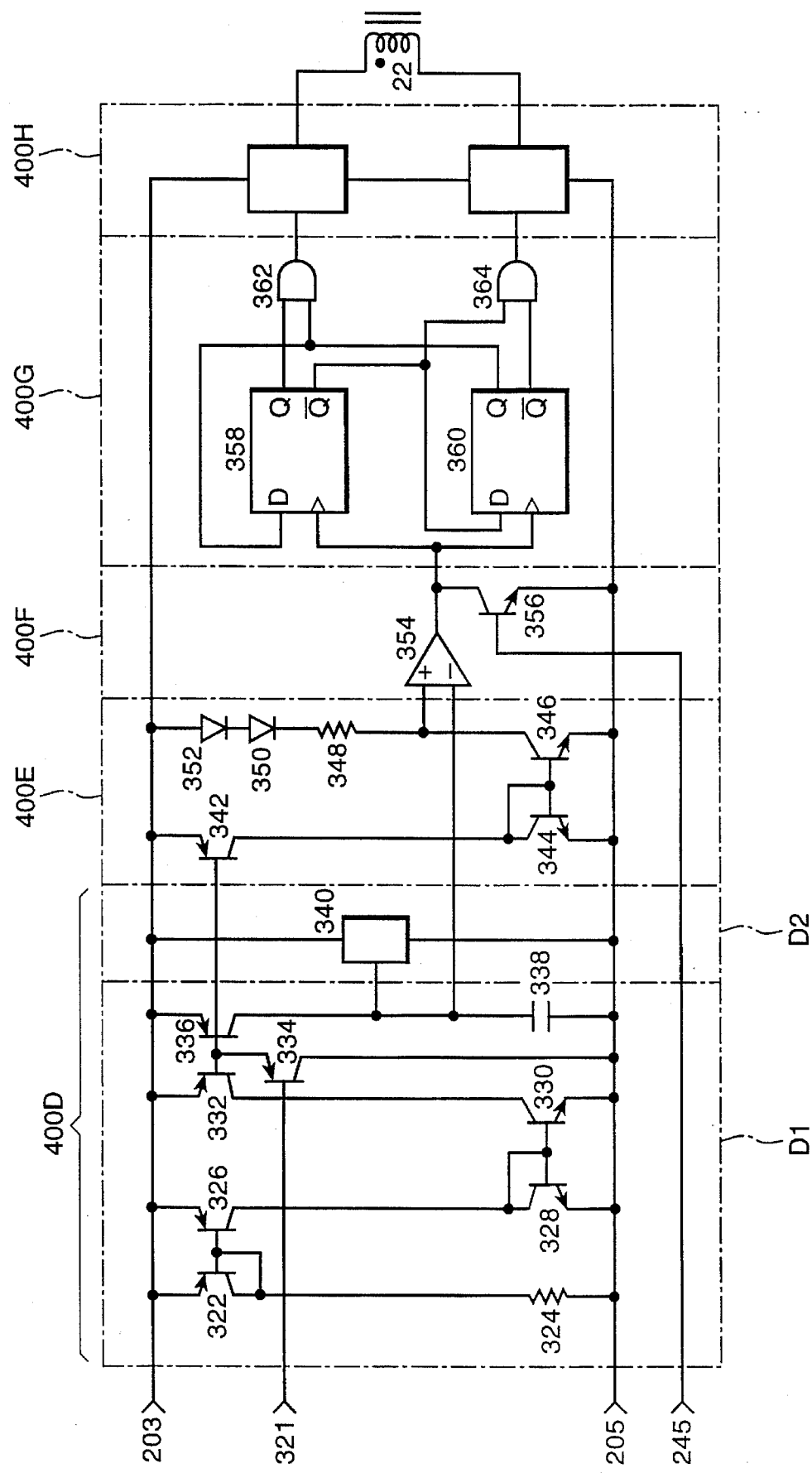

FIGS. 7 and 8 show another embodiment of the switching control signal generator 100 of the present invention. In the above-described embodiment, if the preheating time is set to be constant, in the summer when the ambient temperature is relatively high, the set preheating time is considered to be unnecessarily long, and the discharge starting time is somewhat delayed. Otherwise, in the winter when the ambient temperature is relatively low, since the preheating time is considered to be short and high voltage is applied in a state in which the filament is not sufficiently preheated, the life of the discharge lamp is shortened due to the blackening thereof. This second embodiment comprises a switching control signal generator 100 which helps prevent the shortening of the life of the discharge lamp due to the blackening phenomenon, by adaptively controlling the preheating time in correspondence with the variation of the ambient temperature.

The second embodiment is largely comprised of an overheating prevention circuit 400A, a temperature-to-time controller 400B, a frequency controller 400C, a sawtooth wave signal generator 400D, a variable reference signal generator 400E, a square wave signal generator 400F, a driving signal generator 400G, and a driving circuit 400H.

In the overheating prevention circuit 400A, a transistor 202 and a resistor 206 are serially connected between a first node 201 to which a driving voltage Vi is applied, and a second node 205. A transistor 208 is connected between the collector of a transistor 204 forming a source current mirror with transistor 202, and the second node 205. A transistor 227 constituting a sink current mirror with transistor 208 forms an emitter constant current source. In order to generate a temperature-detecting reference signal, a source-current source 210 and a resistor 212 are serially connected across nodes 201 and 205, with connection node 213 therebetween connected to the base of a transistor 222 via a resistor 214.

An emitter connection node of transistors 224 and 226 form an emitter-coupled differential amplifier and are connected to the emitter constant current source being the collector of transistor 227. The base of transistor 224 is connected to the emitter of transistor 222 and to the first node 201 via the source-current source 220. A temperature-detecting device 232 for detecting the temperature of a switching device is connected between the base of a transistor 228 and the second node 205. Between the first node 201 and the base of transistor 228 are serially connected diodes 234, 236 and 238 and a resistor 240. The base of transistor 226 is connected to the emitter of transistor 228 and to the first node 201 via a source-current source 230. The collector of transistor 226 is connected to the first node 201.

The collector current of transistor 224 is output as the overheating detection signal via transistors 218 and 242 both forming a source current mirror and is fed back to the base of transistor 222 via transistor 218. Source-current source 248 and transistors 244 and 246 all form a sink current mirror, and are all connected to the overheating detection signal output and function as a sink current source.

Specifically, when the terminal voltage of the temperature-detecting device 232 is higher than the potential of connection node 213, the overheating prevention circuit 400A maintains the output to be low since the detected temperature is below a set temperature. When the detected temperature is raised and the potential of connection node 233 is lowered below the potential of connection node 213, the overheating prevention circuit renders the output signal high via transistor 218 and outputs a reset signal. Here, since the base potential of the transistor is even higher via transistor 216, the detected temperature is lowered due to the operation stop state of the switching device so that the output reset is supposed to be released when the potential of connection node 233 is raised to a level above the increased potential, which is the hysteresis loop.

The temperature-to-time controller 400B varies the emitter current of transistor 250 in accordance with the variation of the ambient temperature detected by temperature-detecting device 232, and controls the current signal supplied to sink current source 258 via a resistor 252 and transistors 254 and 256. A capacitor 270 is charged with current set by a resistor 264 at the initial stage of power application via source current mirrors 262 and 266. The charging time of capacitor 270 is controlled by increasing or reducing the current amount bypassed to sink current source 258 via diode 260 according to the variation in temperature.

When the detected temperature increases, the emitter current of transistor 250 increases and the amount of charging current bypassed is reduced so that the capacitor is charged fast. Conversely, when the temperature decreases, the emitter current of transistor 250 is reduced and the amount of charging current bypassed increases so that the charging time in the capacitor is delayed by as much. Accordingly, even when the ambient temperature is lower (as in the winter), the charging time is lengthened and the preheating time is also lengthened so that the filament is sufficiently heated. Conversely, in the summer, the preheating time is shortened.

The output reset signal of overheating prevention circuit 400A is supplied to the base of transistor 268 connected to the ends of capacitor 270 so that when overheating is detected, transistor 268 is conducted and capacitor 270 is discharged. This resets the temperature-to-time controller 400B, and when redriven, the initial operation is carried out.

The frequency controller 400C is designed to prevent the blackening phenomenon during high discharging voltage application, by raising the frequency of the sawtooth wave signal generator 400D during the preheating time set by the temperature-to-time controller 400B and thus by sufficiently heating the filament of the discharge lamp prior to the start of discharge. Particularly, the frequency controller gradually varies the frequency because, if the frequency is drastically varied in the conversion of the preheating mode to the illumination mode, a large amount of discharge current flows so that audible noise is created in the resonance inductor or excessive power is instantly transmitted to system elements.

The frequency controller 400C slowly blocks a preheating current source 276 from acting as the current source of the sawtooth wave signal generator 400D, by a transistor 272 being turned on when the set earlier preheating time ends. Specifically, the potential of connection node 275 is raised via a resistor 274 so as to block a transistor 296. Thereafter, transistor 294 forming a current mirror with transistor 296 is blocked so that the current source 276 is blocked from being connected to the sawtooth wave signal generator 400D. This blockage is performed gradually instead of drastically since this occurs in accordance with the charging operation of capacitor 270.

A dimming current source, made up of a resistor 308, a source current mirror formed by transistors 310 and 312, and a sink current mirror formed by transistors 314 and 316, is connected to the sawtooth wave signal generator 400D via diode 320.

When a transistor 282 forming a current mirror with transistor 314 is turned on to thus make transistors 288 and 290 conduct, transistors 284 and 286 become conductive so that the potential at the cathode terminal of diode 320 is raised to turn off the diode. When the potential of capacitor 270 is raised and transistor 278 is turned on, the potential of a connection node 281 is raised via a resistor 280 and transistors 288 and 290 are turned off. Sequentially, transistors 284 and 286 are turned off, which in turn causes diode 320 to conduct so that the dimming current source is provided to act as the current source of the sawtooth wave signal generator 400A.

Figure 9:
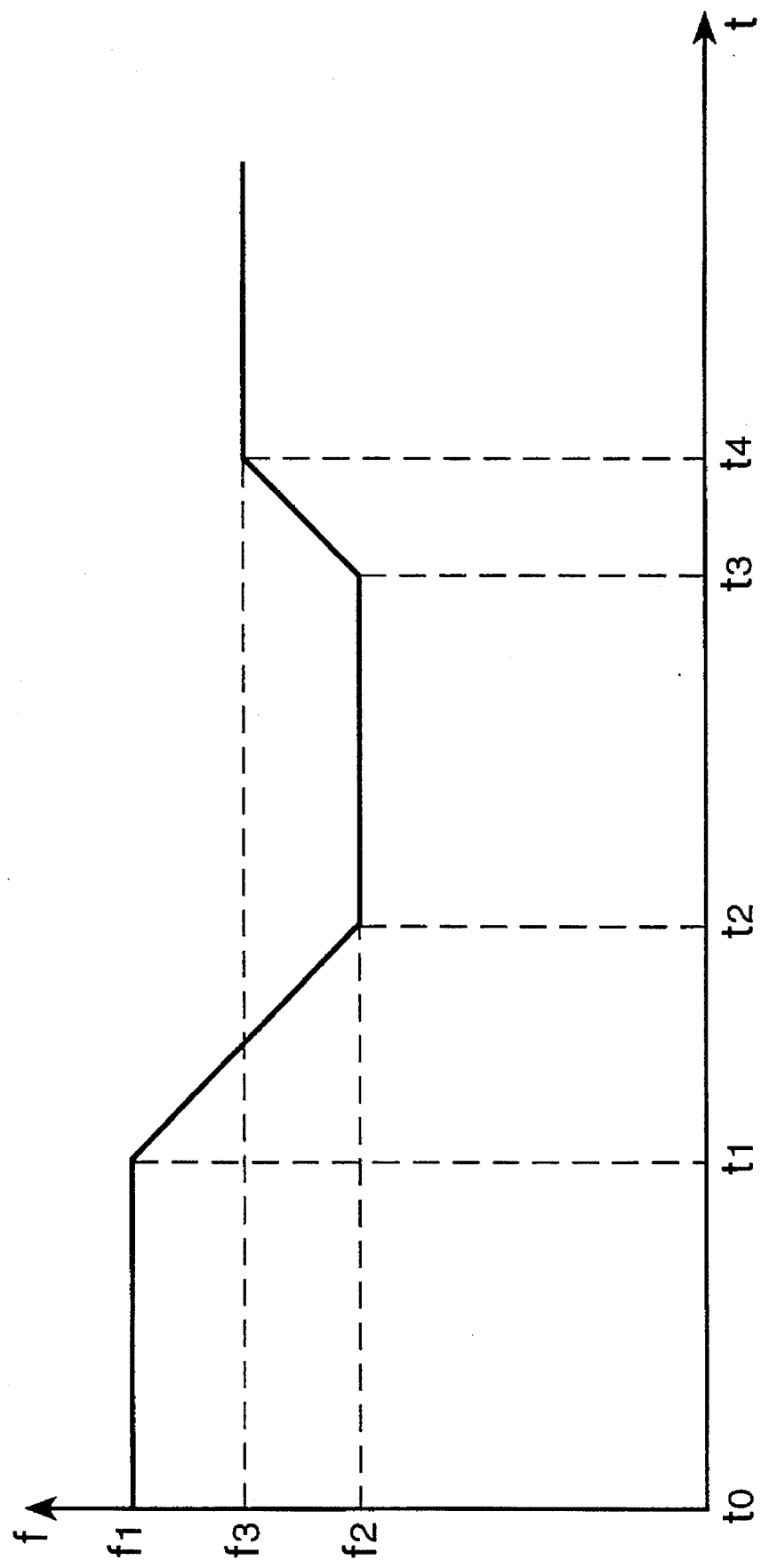
FIG. 9 illustrates the frequency variation operation.

Here, transistor 278 operates gradually in accordance with the charging potential of capacitor 270. Specifically, as shown in FIG. 9, during the earlier preheating time t0–t1, a preheating current source is provided to the sawtooth wave signal generator 400D so that the sawtooth wave is at its highest frequency (f1). Between time t1 and time t2, the preheating current source is blocked so that the frequency is gradually varied from f1 to f2. During illumination between time t2 and time t3, the sawtooth wave is at its lowest frequency (f2). Between time t3 and time t4, an illumination current source is gradually connected thereto as the frequency goes up from f2 to f3. After time t4, the illumination frequency is maintained at f3. Time t1 and time t2 can be adjusted by controlling resistors 302,304 and 306. Time t2 and time t4 can be also controlled by resistors 274 and 280.

A sawtooth wave signal generator 400D is divided into a charging circuit D1 and discharge circuit D2. The discharge circuit D2 is constructed in the same way as that of the first embodiment, and is depicted as a block 340 in FIG. 8 and so its detailed configuration is omitted here.

The charging circuit D1 forms a sawtooth wave current source with a resistor 324, a source current mirror formed by transistors 322 and 324 and a sink current mirror formed by transistors 328 and 330, and forms a source-current source with transistors 332, 334 and 336. The source-current source charges capacitor 338 with the collector current of transistor 336 in response to the sink currents of the preheating current source, the illumination current source and the sawtooth wave current source all of which are connected to connection 321. As the charging time becomes longer or shorter according to the increase or decrease of the charging current, the frequency of the sawtooth signal is varied.

A variable reference signal generator 400E is made up of a transistor 342 current-mirror-coupled to the charging current source, a sink current mirror formed by transistors 344 and 346, diodes 350 and 352 and a resistor 348 connected between a third node 203 and the collector of transistor 346. When the charging current increases, the reference voltage is lowered. When the charging current is otherwise lowered, the reference voltage increases.

A square wave signal generator 400F contains a comparator 354 for receiving the sawtooth wave signal through the inverting port and the reference signal through the noninverting port and comparing them, and a transistor 356 for cutting off the output of comparator 354 in response to the reset signal of the overheating prevention circuit 400A. As the frequency of the sawtooth wave increases, the charging current increases and the reference potential is lowered, and thus the square wave signal generator shortens the dead time between the on and off states of the switching devices 24, 28. If the frequency is otherwise lowered, the charging current is reduced and the reference potential increases, so that the dead time between the on and off states of the switching devices 24, 28 is lengthened.

The detailed description of a driving signal generator 400G and a driving circuit 400H, being only slightly different from the first embodiment in configuration but similar in operation, are omitted here.

As described above, the second embodiment of the present invention, first, prevents the blackening phenomenon because it sufficiently preheats the filament of a discharge lamp even if the ambient temperature is low, by adaptively controlling the preheating time according to temperature. Secondly, by varying the frequency gradually by steps, the embodiment can eliminate audible noise and prevent electrical impacts from being applied to the system, thereby enhancing reliability. Third, the embodiment guarantees the zero-voltage switching of a switching device by varying the potential of a reference signal in correspondence with the frequency variation.

Figure 10:
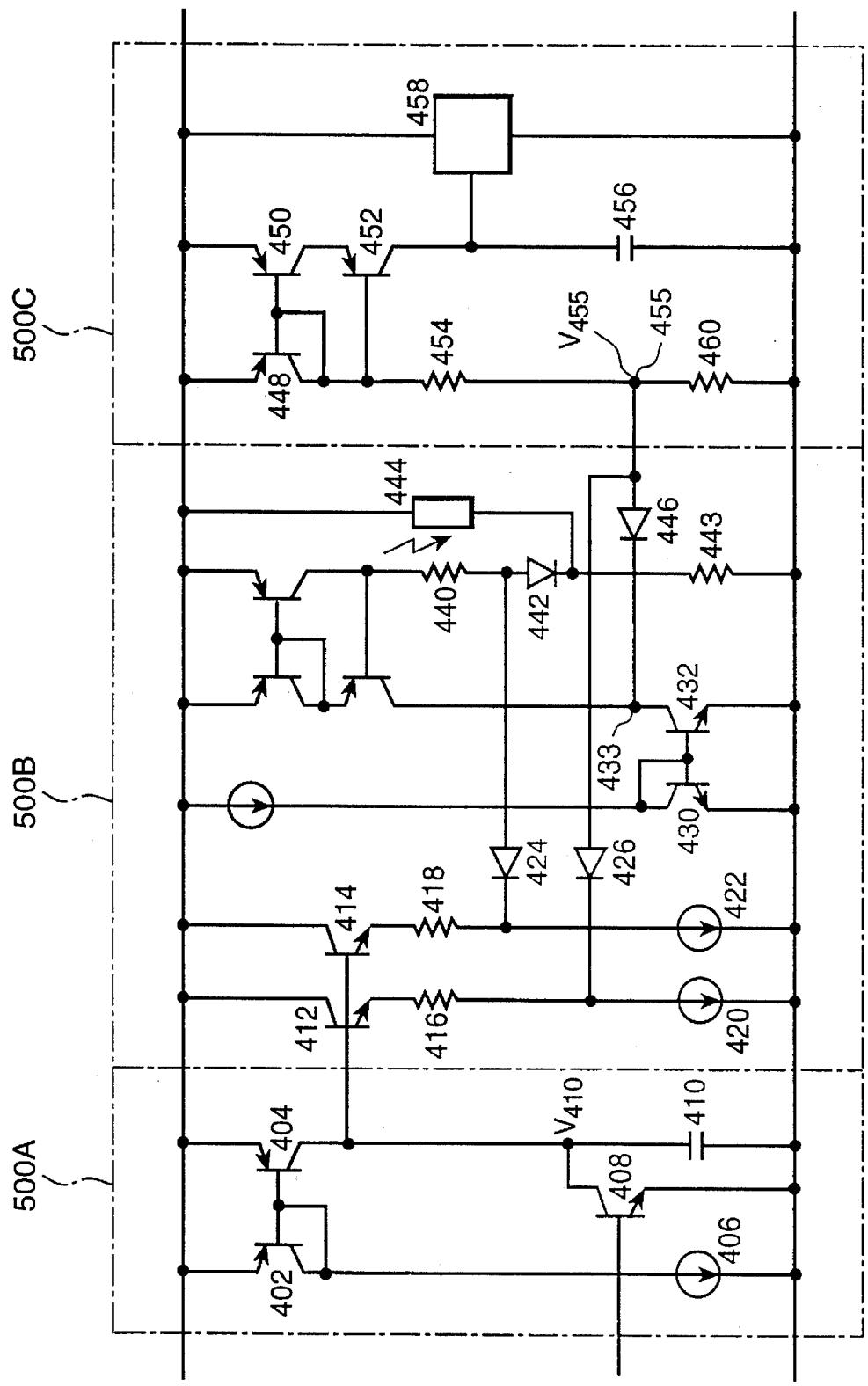
FIG. 10 is a circuit diagram showing the switching control signal generating circuit of the electronic ballast according to yet another embodiment of the present invention.

FIG. 10 is a partial circuit diagram of another embodiment of the switching control signal generator 100 of the present invention. In FIG. 10, reference numeral 500A is a time setting portion. Reference numeral 500B is a frequency controller. Reference numeral 500C is a sawtooth wave signal generator.

The time setting portion 500A consists of a current source 406, a source current mirror formed by transistors 402 and 404, a capacitor 401, and a reset transistor 408. Capacitor 410 is charged with the current set by current source 406.

The frequency controller 500B is made up of a first slope forming portion having a transistor 412 turned on when the terminal voltage of capacitor 410 reaches a predetermined potential, a resistor 416, a current source 420, and a diode 426. A second slope forming portion has a transistor 414, a resistor 418, a current source 422, and a diode 424. An illumination portion consists of a current source, a sink current mirror formed by transistors 430 and 432, a source current mirror formed by transistors 434, 438 and 436, a resistor 440, a diode 442, a resistor 443, a diode 446, and a photo-sensor 444.

The sawtooth wave signal generator 500C has a source-current source consisting of transistors 448, 450 and 452, resistors 454 and 460, a capacitor 456, and a discharge circuit 458.

Figure 11A:
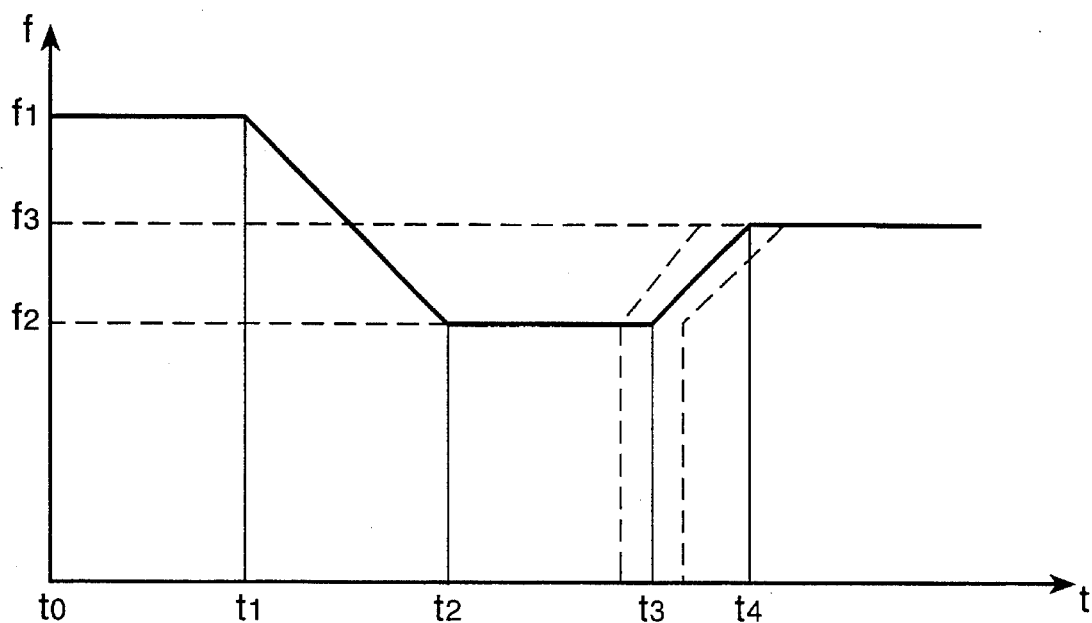
FIGS. 11A and 11B show the operation of the circuit shown in FIG. 10.
Figure 11B:
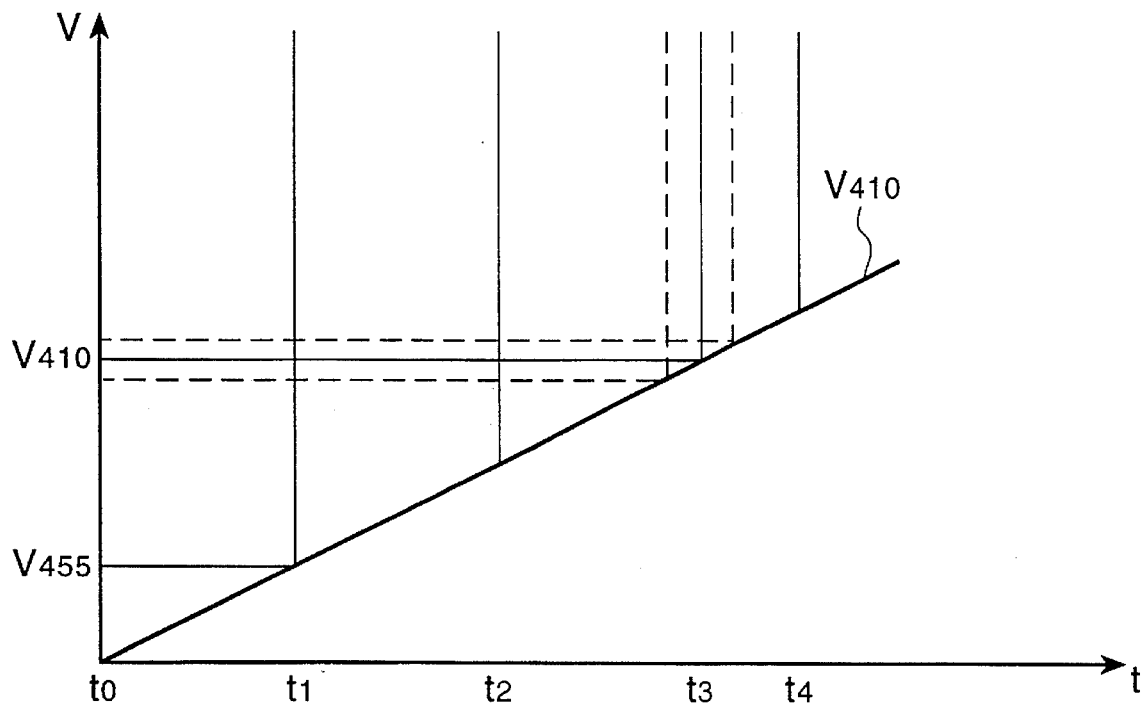

Referring to FIG. 11, for time t0–t1 during which the terminal voltage V410 of capacitor 410 is smaller than the terminal voltage V455 of resistor 460, since transistor 412 is turned off, current source 420 is connected to a connection node 455 via diode 426. By doing so, the current charged in capacitor 456 increases and therefore the charging time is shortened so that the frequency of the sawtooth wave signal stays at f1. Accordingly, the filament is preheated even though the energy accumulated in the resonant circuit is too small to begin discharging.

When the potential of capacitor 410 is equal to voltage V455 at time t1, transistor 412 is turned on and current starts to flow. When the current becomes equal to the current of current source 420, diode 420 is turned off and the frequency is lowered from f1 to f2. At this time, discharging begins. After time t2, the frequency is held at f2, and the discharge lamp is driven in the illumination mode.

In the state in which transistor 414 is blocked, since current source 422 is connected to connection node 441 via diode 424 and the collector current of transistor 436 is greater than that of transistor 432, diode 446 is turned off and the frequency stays at f2. At time t3 in which the potential of capacitor 410 increases to V441 (that of the connection node 441), transistor 414 is turned on and current begins to flow. Then, the current flows through diode 446 and the frequency of the sawtooth wave signal starts to increase thereafter (from time t3). When the emitter current of transistor 414 becomes equal to the current of current source 422, diode 424 is turned off at time t4 and a large amount of current flows instead through diode 446 so that the frequency of the sawtooth wave signal is held at f3.

A photo-sensor 444 controls the intensity of the discharge lamp in accordance with the surrounding brightness, using the illumination power held between f2 and f3. In other words, the potential of connection node 445 increases for darker surroundings, to thereby supply a large amount of power so that the frequency is lowered and the light is emitted more brightly, and in brighter conditions, the potential of connection node 455 is lowered to raise the frequency.

Figure 12:
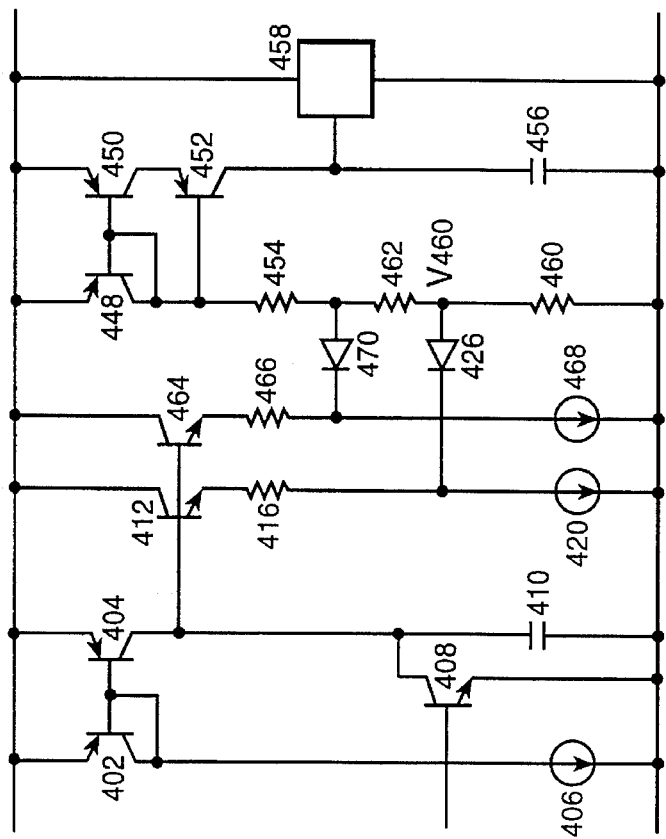
FIG. 12 shows a circuit diagram of the switching control signal generating circuit of the electronic ballast according to a further embodiment of the present invention.

FIG. 12 is a circuit diagram of yet another embodiment of the frequency controller of the present invention. This frequency controller is designed to reduce the frequency by steps so that the frequency is gradually varied when the preheating operation is switched to the illuminating operation. For this controller, like portions, as in the other embodiments, have the same reference numerals and thus their detailed description will be omitted. Here, the difference from the other embodiment is that this embodiment (FIG. 12) further comprises a third slope forming portion made up of a transistor 464, a resistor 466, a current source 468, and a diode 470. A further difference is that a resistor 462 is added to the sawtooth wave signal generator.

Figure 13:
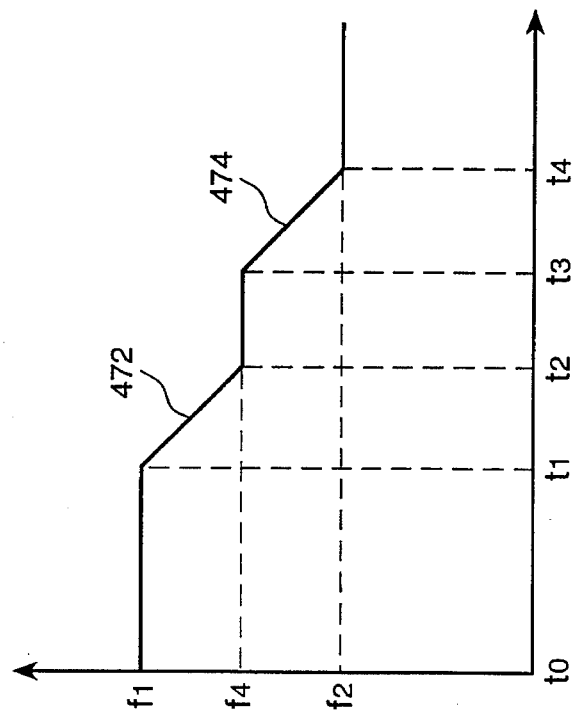
FIG. 13 illustrates the operation of the circuit shown in FIG. 12.

In the embodiment of FIG. 12, since a first slope 472 and a second slope 474 (both of FIG. 13) are formed respectively by the first slope forming portion and the third slope forming portion, the frequency variation is more gradual. At time t1 at which the potential of capacitor 410 becomes equal to voltage V455, the first slope begins, and at time t3 at which the potential is equal to voltage V462, the second slope begins. Although a two-step slope is suggested in this embodiment, a configuration producing a multiple steps is made possible by adding on more such stages.

Figure 14:
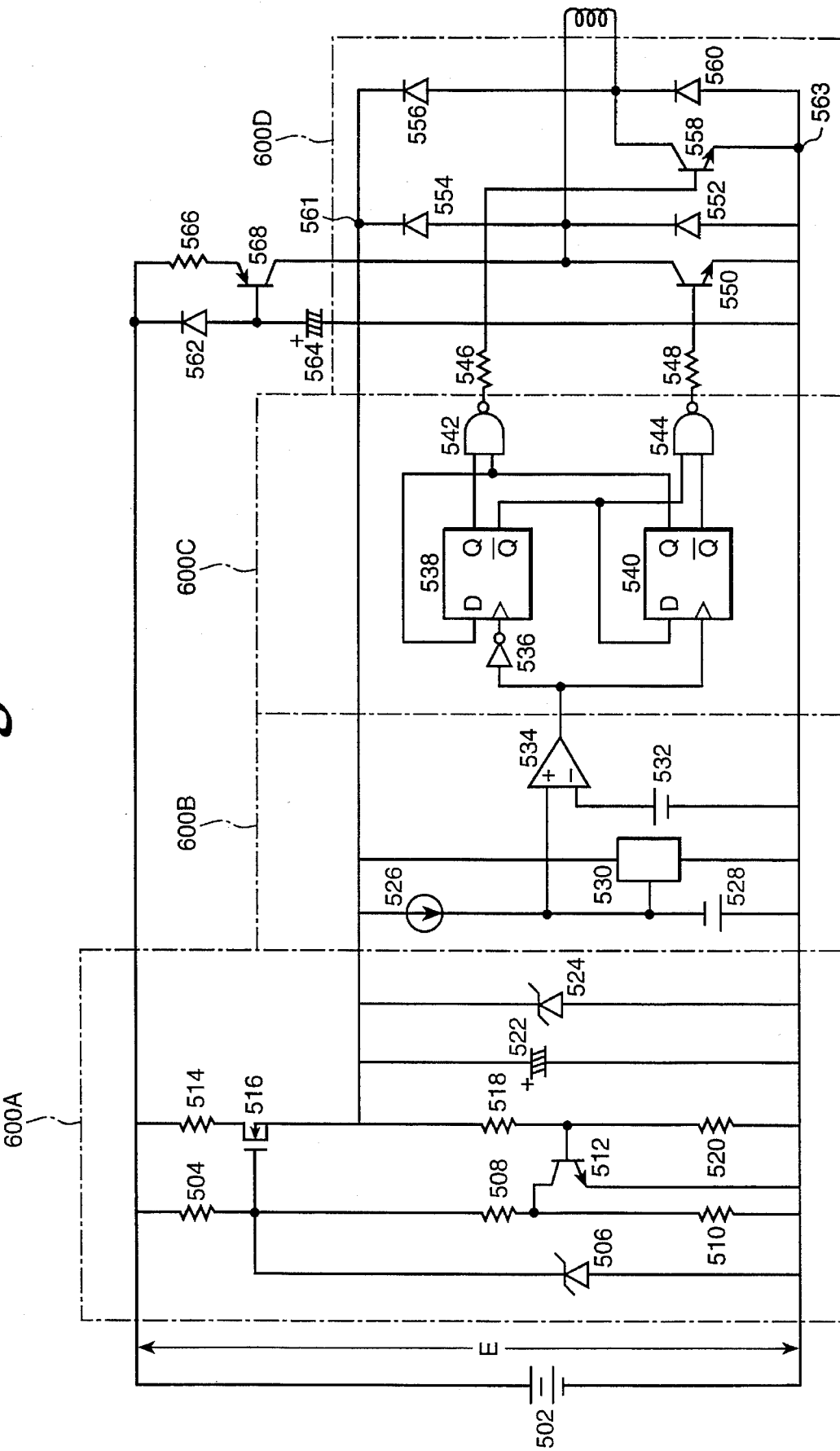
FIG. 14 is a circuit diagram showing the switching control signal generating circuit of the electronic ballast according to yet still another embodiment of the present invention.

FIG. 14 is a circuit diagram of yet another embodiment of the switching control signal generator of the present invention. Since the driving circuit of the switching control signal generator drives the fourth winding 22 of the primary side of the driving transformer 200 in the full-bridge pattern with four transistors, serially connected transistors become instantaneously and simultaneously conductive to create a large short-circuit current value which acts as noise to the circuit and may cause circuit malfunction. This also creates power loss. This embodiment is to improve the driving circuit in order to overcome such problems. Here, the embodiment further comprises a stabilizer for using the power voltage of the generator as regenerative current.

The switching control signal generator of this embodiment comprises a power stabilizer 600A, a square wave signal generator 600B, a driving signal generator 600C, and a driving circuit 600D.

The power stabilizer 600A consists of resistors 504, 508 and 510 which are connected in series across DC power source 502, a transistor 512 connected across resistor 510, a Zener diode 506 connected across resistors 508 and 510, an FET transistor 516 whose gate is connected to the connection node of resistors 504 and 506, whose drain is connected to one side of the DC power source 502 via a resistor 514, and whose source is connected to the other side of the DC power source 502 via resistors 518 and 520, a capacitor 522, and a Zener diode 524.

At the earlier stage of power application, FET transistor 516 is turned on via resistor 504 so that capacitor 522 is charged with the Zener voltage of Zener diode 524. When transistor 512 is turned on by resistors 518 and 520 and the gate potential of transistor 516 is lowered to cut off current flow, the power supply from the DC power source 502 to capacitor 522 is blocked and thereafter the current regenerated via the fourth winding 22 of the driving transformer 200 is charged for use as the operation power. Accordingly, the power stabilizer 600A provides a stable power voltage by charging capacitor 522 with regenerative current at the Zener voltage.

Since the square wave signal generator 600B and the driving signal generator 600C are similar to the aforementioned embodiments in terms of configuration, the description of their specific circuit construction and operation are omitted here.

In the driving circuit 600D, diodes 554 and 552 are reverse-biased and connected in series between a first node 561 and a second node 563. Likewise, diodes 556 and 560 are reverse-biased and connected in series therebetween. A transistor 550 is connected across diode 552. The base thereof is coupled to the second driving signal via a resistor 548. The positive terminal of the fourth winding 22 of the driving transformer 200 is connected to the common node between diodes 554 and 552, and the negative terminal thereof is connected to the common node between diodes 556 and 560. A transistor 558 is connected across diode 560, with its base being coupled via a resistor 546 to receive the first driving signal. A reverse-biased diode 562 and a capacitor 564 are connected between the positive and negative terminals of the DC power source 502. The emitter of a transistor 568 is connected to the positive terminal via a resistor 566, its base is connected to the common node between diode 562 and capacitor 564, and the collector thereof is connected to the collector of transistor 550 and the collector current is cut off after the initial supply of power. Before capacitor 564 is charged, the DC power is supplied via transistor 568 so that energy is accumulated in the fourth winding 22. When capacitor 564 is charged, transistor 568 is turned off, thereby cutting off the supply of DC power.

As shown in FIG. 15A, the sawtooth wave signal and reference signal 532, which are the terminal voltage signals of capacitor 528, are compared by comparator 534 and the square wave signal shown in FIG. 15B is output therefrom. When the square wave signal is applied to the clock port of flip-flop 538 via gate 536 and to the clock port of flip-flop 540, the square wave signals shown in FIGS. 15C–15F are output via the respective flip-flop outputs ports, and the first and second driving signals shown in FIGS. 15G and 15H are generated via gates 542 and 544. When the first and second driving signals are both high, since transistors 550 and 558 conduct, the current accumulated in the fourth winding 22 is free-wheeled. If transistor 558 is turned off, the switching control signal shown in FIG. 15I is induced to the fourth winding 22 and transmitted to the winding of the secondary side of the driving transformer 200. The current regenerated from the resonant circuit is induced to the fourth winding as shown in FIG. 15J, and the induced regenerative current is full-wave-rectified via bridge diodes 552, 554, 556 and 560 and provided as the operating current. The resonant current shown in FIG. 15K flows through the serial resonant circuit.

While the invention has been particularly shown and described with reference to a preferred embodiment and alterations thereto, it should be understood by those skilled in the art that various changes in form and detail may be made therein without departing from the spirit and scope of the invention as defined by the appended claims.

What is claimed is:

1. A zero-voltage switching type electronic ballast for a fluorescent lamp comprising:

a DC power source providing DC power to first and second nodes;

a first and second capacitor connected in series between said first and second nodes of said DC power source and being connectable therebetween to a first side of said flourescent lamp;

a first and second switching device having current paths connected in series between said first and second nodes of said DC power source and having a switching device connection node therebetween;

a third capacitor connected in parallel across said current path of said first switching device;

a fourth capacitor connected in parallel across said current path of said second switching device;

a driving transformer having first, second, third and fourth windings, said first winding being connected between a first switching device control line to said first switching device and said switching device connection node, said second winding being connected to said switching device connection node, and said third winding being connected between a second switching device control line to said second switching device and said second node of said DC power source;

a load resonant circuit connected to said third winding and connectable to a second side of said flourescent lamp; and switching control signal generating means connected to said fourth winding of said driving transformer, for comparing a comparison signal of a predetermined high frequency with first and second reference signals, and for interposing a predetermined dead time therebetween, said switching control signal generating means driving said fourth winding so that said first and second windings of said driving transformer alternately control said first and second switching devices, respectively, to switch when a voltage applied across said current paths of said first and second switching devices is zero, said switching control signal generating means comprising:

sawtooth wave signal generator means connected to said DC power source for generating a comparison signal having a first frequency for a predetermined time, and after said predetermined time, having a second frequency, square wave signal generator means connected to said sawtooth wave signal generator means, for comparing said comparison signal to a reference voltage, and for generating a square wave signal, driving signal generator means connected to said square wave signal generator means, for receiving said square wave signal and for generating a driving signal, driving circuit means connected to said driving signal generator means, for driving said fourth winding of said driving transformer in forward and reverse directions with a dead time interposed therebetween, said dead time guaranteeing a zero-voltage switching of said first and second switching devices, overheating prevention means connected to said sawtooth wave signal generator means, for detecting a temperature of said first and second switching devices, and for shutting down said square wave signal generator means if said detected temperature is above a predetermined temperature, and over-current prevention means connected to said driving signal generator means, for detecting a current regenerated via said fourth winding, and for shutting down said square wave signal generator means if said detected current is above a predetermined value.

2. A zero-voltage switching type electronic ballast for a fluorescent lamp according to claim 1, wherein said switching control signal generating means further comprises:

input voltage variation detecting means connected to said DC power source, for raising a frequency of said comparison signal of said sawtooth wave signal generator when an input voltage goes higher than a predetermined voltage, and for lowering said frequency of said comparison signal when said input voltage is lower than said predetermined voltage, thereby maintaining a substantially constant input power with a variation of said input voltage.

3. A zero-voltage switching type electronic ballast for a fluorescent lamp according to claim 1, wherein said driving circuit means is formed in a full-bridge pattern and rectifies regenerative current induced to said fourth winding to reuse said regenerative current as operating power to said electronic ballast.

4. A zero-voltage switching type electronic ballast for a fluorescent lamp comprising:

a DC power source providing DC power to first and second nodes;

a first and second capacitor connected in series between said first and second nodes of said DC power source and being connectable therebetween to a first side of said flourescent lamp;

a first and second switching device having current paths connected in series between said first and second nodes of said DC power source and having a switching device connection node therebetween;

a third capacitor connected in parallel across said current path of said first switching device;

a fourth capacitor connected in parallel across said current path of said second switching device;

a driving transformer having first, second, third and fourth windings, said first winding being connected between a first switching device control line to said first switching device and said switching device connection node, said second winding being connected to said switching device connection node, and said third winding being connected between a second switching device control line to said second switching device and said second node of said DC power source;

a load resonant circuit connected to said third winding and connectable to a second side of said flourescent lamp; and switching control signal generating means connected to said fourth winding of said driving transformer, for comparing a comparison signal of a predetermined high frequency with first and second reference signals, and for interposing a predetermined dead time therebetween, said switching control signal generating means driving said fourth winding so that said first and second windings of said driving transformer alternately control said first and second switching devices, respectively, to switch when a voltage applied across said current paths of said first and second switching devices is zero, said switching control signal generating means comprising:

sawtooth wave signal generator means connected to said DC power source for generating a comparison signal having a first frequency for a predetermined time, and after said predetermined time, having a second frequency, square wave signal generator means connected to said sawtooth wave signal generator means, for comparing said comparison signal to a reference voltage, and for generating a square wave signal, driving signal generator means connected to said square wave signal generator means, for receiving said square wave signal and for generating a driving signal, driving circuit means connected to said driving signal generator means, for driving said fourth winding of said driving transformer in forward and reverse directions with a dead time interposed therebetween, said dead time guaranteeing a zero-voltage switching of said first and second switching devices, temperature-to-time controller means connected to said sawtooth wave signal generator means, for adaptively controlling an initial preheating time in accordance with a variation of ambient temperature, and frequency controller means connected to said temperature-to-time controller means, for controlling said comparison signal to be said first frequency for a time set by said temperature-to-time controller means, and for gradually varying said comparison signal to be said second frequency.

5. A zero-voltage switching type electronic ballast for a fluorescent lamp according to claim 4, wherein said frequency controller means further comprises an illumination circuit means for gradually varying said comparison signal at said second frequency to be at a third frequency, and for maintaining an illumination power at said third frequency.

6. A zero-voltage switching type electronic ballast for a fluorescent lamp according to claim 5, wherein said switching control signal generator means includes a variable reference voltage means for variably controlling said reference voltage of said square wave signal generator in correspondence with a variation of frequency of said sawtooth wave signal generator.

7. A zero-voltage switching type electronic ballast for a fluorescent lamp, comprising:

a DC power source providing DC power to first and second nodes;

first and second switching means having current paths connected in series between said first and second nodes of said DC power source and having a switching device connection node therebetween, for providing power to said flourescent lamp in first and second directions, respectively;

a driving transformer having first, second, third and fourth windings, said first winding being connected between said first switching means and said switching device connection node, said second winding being connected to said switching device connection node, and said third winding being connected between said second switching means and said second node of said DC power source;

switching control signal generating means connected to said fourth winding of said driving transformer, for driving said fourth winding so that said first and second windings of said driving transformer alternately control said first and second switching means, respectively, to switch when a voltage applied across said current paths of said first and second switching means is zero, said switching control signal generating means comprising:

sawtooth wave signal generator means connected to said DC power source for generating a comparison signal having a first frequency for a predetermined time, and after said predetermined time, having a second frequency, square wave signal generator means connected to said sawtooth wave signal generator means, for comparing said comparison signal to a reference voltage, and for generating a square wave signal, driving signal generator means connected to said square wave signal generator means, for receiving said square wave signal and for generating a driving signal, driving circuit means connected to said driving signal generator means, for driving said fourth winding of said driving transformer in forward and reverse directions with a dead time interposed therebetween, said dead time guaranteeing a zero-voltage switching of said first and second switching means, overheating prevention means connected to said sawtooth wave signal generator means, for detecting a temperature of said first and second switching means, and for shutting down said square wave signal generator means if said detected temperature is above a predetermined temperature, and over-current prevention means connected to said driving signal generator means, for detecting a current regenerated via said fourth winding, and for shutting down said square wave signal generator means if said detected current is above a predetermined value;

wherein said flourescent lamp is connectable between said third winding of said driving transformer and said DC power source.

8. A zero-voltage switching type electronic ballast for a fluorescent lamp according to claim 7, wherein said switching control signal generating means further comprises:

input voltage variation detecting means connected to said DC power source, for raising a frequency of said comparison signal of said sawtooth wave signal generator when an input voltage goes higher than a predetermined voltage, and for lowering said frequency of said comparison signal when said input voltage is lower than said predetermined voltage, thereby maintaining a substantially constant input power with a variation of said input voltage.

9. A zero-voltage switching type electronic ballast for a fluorescent lamp comprising:

a DC power source providing DC power to first and second nodes;

first and second switching means having current paths connected in series between said first and second nodes of said DC power source and having a switching device connection node therebetween, for providing power to said flourescent lamp in first and second directions, respectively;

a driving transformer having first, second, third and fourth windings, said first winding being connected between said first switching means and said switching device connection node, said second winding being connected to said switching device connection node, and said third winding being connected between second switching means and said second node of said DC power source;

switching control signal generating means connected to said fourth winding of said driving transformer, for driving said fourth winding so that said first and second windings of said driving transformer alternately control said first and second switching means, respectively, to switch when a voltage applied across said current paths of said first and second switching means is zero, said switching control signal generating means comprising:

sawtooth wave signal generator means connected to said DC power source for generating a comparison signal having a first frequency for a predetermined time, and after said predetermined time, having a second frequency, square wave signal generator means connected to said sawtooth wave signal generator means, for comparing said comparison signal to a reference voltage, and for generating a square wave signal, driving signal generator means connected to said square wave signal generator means, for receiving said square wave signal and for generating a driving signal, driving circuit means connected to said driving signal generator means, for driving said fourth winding of said driving transformer in forward and reverse directions with a dead time interposed therebetween, said dead time guaranteeing a zero-voltage switching of said first and second switching means, temperature-to-time controller means connected to said sawtooth wave signal generator means, for adaptively controlling an initial preheating time in accordance with a variation of ambient temperature, and frequency controller means connected to said temperature-to-time controller means, for controlling said comparison signal to be said first frequency for a time set by said temperature-to-time controller means, and for gradually varying said comparison signal to be said second frequency;

wherein said flourescent lamp is connectable between said third winding of said driving transformer and said DC power source.

10. A zero-voltage switching type electronic ballast for a fluorescent lamp, comprising:

a DC power source providing DC power to first and second nodes;

first and second switching means connected in series between said first and second nodes of said DC power source and having a switching device connection node therebetween, for providing power to said flourescent lamp in first and second directions, respectively;

switching control signal generator means connected to said first and second switching means, for driving said first and second switching means alternately with a dead time interposed therebetween, and for preventing current from flowing through said first and second switching means during said dead time, said switching control signal generator means comprising:

transformer means, said transformer means includes first, second, third and fourth windings, said first winding being connected between said first switching means and said switching device connection node, said second winding being connected to said switching device connection node, and said third winding being connected between said second switching means and said second node of said DC power source, overheating prevention means connected to said sawtooth wave signal generator means, for detecting a temperature of said first and second switching devices, and for shutting down said square wave signal generator means if said detected temperature is above a predetermined temperature, and over-current prevention means connected to said driving signal generator means, for detecting a current regenerated via said fourth winding, and for shutting down said square wave signal generator means if said detected current is above a predetermined value;

said flourescent lamp being connectable between said switching device connection node and said DC power source; and said switching control signal generating means being connected to said fourth winding of said driving transformer.

11. A zero-voltage switching type electronic ballast for a fluorescent lamp according to claim 10, wherein said switching control signal generating means comprises:

sawtooth wave signal generator means connected to said DC power source for generating a comparison signal having a first frequency for a predetermined time, and after said predetermined time, having a second frequency;

square wave signal generator means connected to said sawtooth wave signal generator means, for comparing said comparison signal to a reference voltage, and for generating a square wave signal;

driving signal generator means connected to said square wave signal generator means, for receiving said square wave signal and for generating a driving signal; and driving circuit means connected to said driving signal generator means, for driving said fourth winding of said driving transformer in forward and reverse directions with a dead time interposed therebetween, said dead time guaranteeing a zero-voltage switching of said first and second switching devices.

12. A zero-voltage switching type electronic ballast for a fluorescent lamp according to claim 10, wherein said switching control signal generating means further comprises:

input voltage variation detecting means connected to said DC power source, for raising a frequency of said comparison signal of said sawtooth wave signal generator when an input voltage goes higher than a predetermined voltage, and for lowering said frequency of said comparison signal when said input voltage is lower than said predetermined voltage, thereby maintaining a substantially constant input power with a variation of said input voltage.

13. A zero-voltage switching type electronic ballast for a fluorescent lamp wherein said switching control signal generating means further comprising:

a DC power source providing DC power to first and second nodes;

first and second switching means connected in series between said first and second nodes of said DC power source and having a switching device connection node therebetween, for providing power to said flourescent lamp in first and second directions, respectively;

switching control signal generator means connected to said first and second switching means, for driving said first and second switching means alternately with a dead time interposed therebetween, and for preventing current from flowing through said first and second switching means during said dead time, said switching control signal generator means comprising:

transformer means, said transformer means includes first, second, third and fourth windings, said first winding being connected between said first switching means and said switching device connection node, said second winding being connected to said switching device connection node, and said third winding being connected between said second switching means and said second node of said DC power source, temperature-to-time controller means connected to said sawtooth wave signal generator means, for adaptively controlling an initial preheating time in accordance with a variation of ambient temperature, and frequency controller means connected to said temperature-to-time controller means, for controlling said comparison signal to be said first frequency for a time set by said temperature-to-time controller means, and for gradually varying said comparison signal to be said second frequency;

said flourescent lamp being connectable between said switching device connection node and said DC power source; and said switching control signal generating means being connected to said fourth winding of said driving transformer.

* * * * *